Oct. 27, 1936.　　　　A. WEISS　　　　2,059,069

AUTOMATICALLY CONTROLLED BRAKE FOR MOTOR VEHICLES

Filed April 9, 1935

INVENTOR
Abraham Weiss
BY
ATTORNEY

Patented Oct. 27, 1936

2,059,069

UNITED STATES PATENT OFFICE 2,059,069

AUTOMATICALLY CONTROLLED BRAKE FOR MOTOR VEHICLES

Abraham Weiss, New York, N. Y., assignor to Joe Weiss, New York, N. Y.

Application April 9, 1935, Serial No. 15,411

4 Claims. (Cl. 192—4)

The invention relates to motor vehicles and specifically to vehicles having automatically controlled brakes, such as those operated through power units.

The main object of this invention is to provide means which will eliminate the use of brake pedals and whereby the operation of the brakes will be effected solely through the operation of the speed and clutch control mechanism.

Another object is to provide means whereby the power unit may be readily controlled so that the brakes may be automatically applied or released at will.

A still further object is to provide suction controlling valves in connection with the power unit which will be automatically operated from the speed and clutch control mechanism.

The advantages of my invention are numerous. Firstly, it eliminates brake pedals and thereby reduces the cost and simplifies the operation of a motor vehicle. The elimination of a brake pedal leaves the foot operating the accelerator pedal free for the latter so that the driver can keep his said foot always in the position ready to press on the accelerator. Secondly, the operation of the brakes is rendered entirely automatic. Thirdly, the arrangement of my new control system is such that the vehicle will be instantaneously arrested by the automatic application of the brakes as soon as the gear shift is put into neutral, and hence, rolling back and forward when stopped on a slope, will be prevented. Fourthly, the brakes will be applied automatically whenever the clutch is completely thrown out for the shifting of the gears either into neutral or speed. Fifthly, by throwing the clutch only partly the brakes will be off.

With these and other objects in view, my invention consists in the novel combination, arrangement and construction of parts as hereinafter more fully described and set forth in the appended claims.

Figure 1:
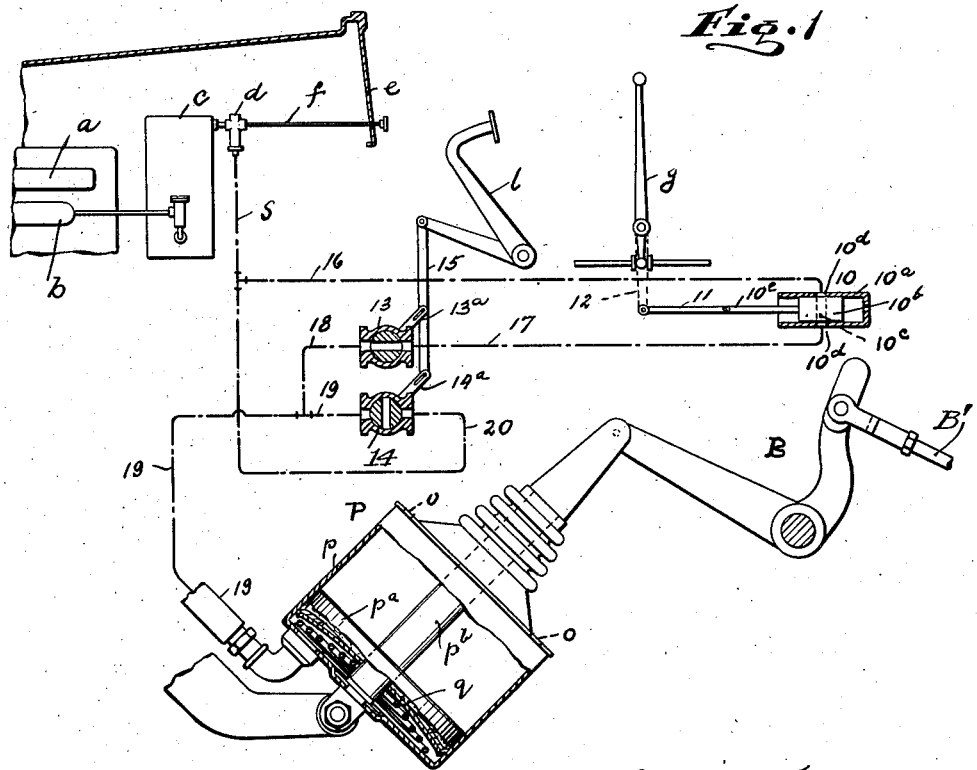
Figure 2:
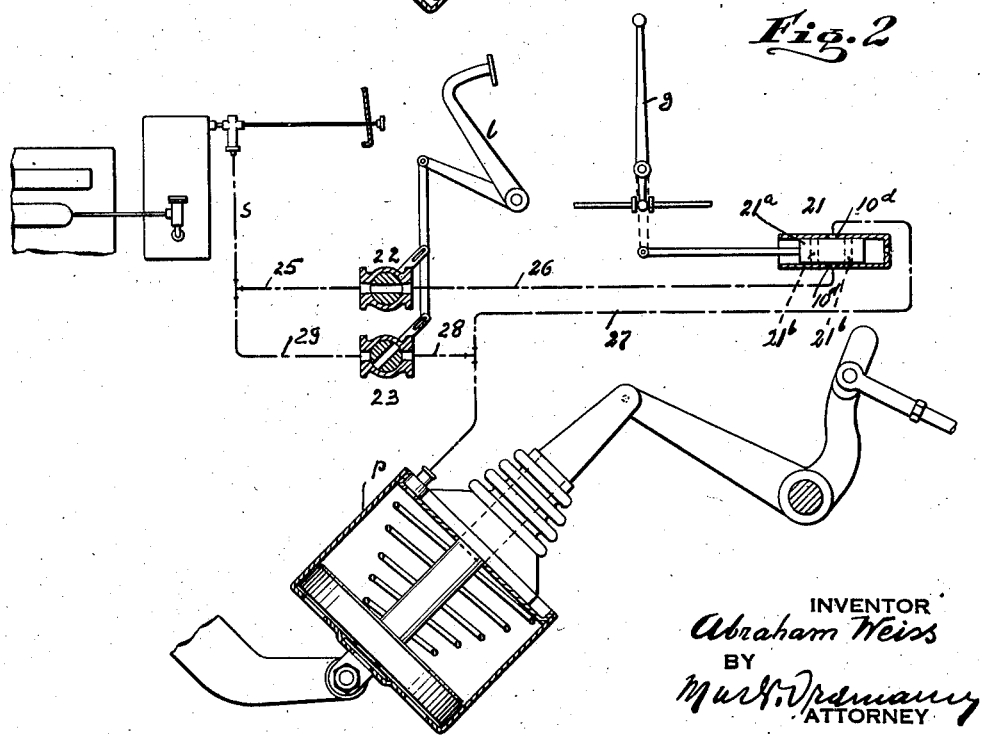

In the drawing which forms part of this specification, and in which similar reference characters denote corresponding parts, Fig. 1 is a more or less diagrammatical view of one embodiment of my invention, and Fig. 2 is a similar view of a modification thereof, $a$ denotes the motor of a vehicle, $b$ the intake manifold, $c$ an auxiliary vacuum tank, $d$ a vacuum control check valve and $f$ a push rod for operating said check valve from the dash board $e$ of the vehicle.

P denotes a power unit or so-called booster of well known construction which, in the present example, may be controlled through suction action derived directly from the motor or indirectly from the auxiliary or storage vacuum tank $c$.

In the embodiment shown in Fig. 1 this power unit P comprises a cylinder $p$ in which works a piston $p^a$ whose piston rod $p^b$ is operatively connected to the lever mechanism B operating the brakes of which rod B' constitutes a part. Acting against the rear end of the piston $p^a$ is the spring $q$ and terminating into this rear end of the cylinder $p$ is a pipe 19 leading from the check valve $d$.

When there is suction behind the piston $p^a$, the atmospheric pressure in front of the piston which is entering the cylinder through openings $o$, will move the piston rearwardly against the pressure of spring $q$ and as a result thereof apply the brakes in well known manner. But when suction is cut off from the rear of the piston $p^a$ the spring $q$ will move the latter forwardly and release the brakes. Thus far, the construction and operation of the power unit are well known.

My invention resides in the means for controlling the suction in the power unit not through the brake pedal, but through the gear shift and clutch mechanism, so that the brakes will be actuated entirely automatically and the brake pedal can be dispensed with entirely.

To this end the gear shift rod $g$, and the clutch pedal $l$ are each coordinated with means which are included in the power transmitting system to control the power in said power unit so as to apply or release the brakes.

In the example shown, said means include valves and branch pipes included in the suction pipe system. There is a valve 10 operated from the gear shift rod $g$ and which may be of any suitable construction, but which as shown comprises a horizontally disposed tubular chamber 10a in which slidably moves a piston 10b formed with a transversely extending duct 10c, the open ends of which are adapted, in the neutral position of the gear shift rod $g$, to register with diametrically opposed passages 10d, 10d provided in the cylinder 10a. The piston rod 10e is connected by a link 11 to an extension 12 provided on the rod $g$ of the gear shift mechanism.

There are, further, valves 13, 14, operated from the clutch pedal $l$ and which may be of any suitable construction, but are shown in form of common faucet cocks whose handles 13a, 14a, are operatively connected to a common rod or bar 15 pivoted to the clutch pedal.

Branching off the main pipe line s leading from the check valve d are pipes 16, 17, 18, 19 and 20, pipe 16 terminating in one of the passages 10d of valve 10, pipe 17 leading from the opposite passage 10d into the one side of cock 13, and pipe 18 leading from the other side of cock 13 into pipe section 19 whose one end terminates in one side of cock 14 and whose other end terminates in the rear cylinder p of the power unit P. Leading from the other side of cock 14 into the main pipe s is the pipe 20.

The valves 13, 14 are so adjusted relative to one another that cock 13 will be open, and cock 14 closed when the clutch pedal is released, and that both cocks will be closed when said pedal is partly depressed, but that cock 14 will be open when said pedal is completely depressed.

The valves 10, 13, 14 are in such relation to one another that when the gear shift and clutch are both in neutral position or when the gear shift is in speed and the clutch is completely depressed braking action will be automatically effected, but when the clutch is only partly depressed and the gear shift either in neutral or in speed braking action will be automatically released.

The working of my device is as follows:

When the gear shift g is in neutral, i. e. inoperative position, and the clutch pedal up, valves 10 and 13 will be open so that suction will enter the cylinder p at the rear of the piston $p^a$ through the main pipe s and branches 16, 17, 18 and 19. The atmospheric pressure in front of the piston $p^b$ will cause the latter to move rearwardly and consequently apply the brakes in well known manner.

When the gear shift is being adjusted to speed, and the clutch pedal is completely depressed, valves 10 and 13 will be closed, but valve 14 opened so that suction will enter the power unit through valve 14, main pipe s and pipe sections 20, 19 causing the piston $p^a$ to apply the brakes in the aforenamed manner. When the clutch is only partly depressed, while the gear shift is in neutral position, suction in the power unit will be interrupted and the brakes will be released.

Hence, while the gear shift is in speed the brakes can be applied by simply completely depressing the clutch pedal. There is no occasion for the driver to change the position of his foot operating the accelerator, as is the case when using a brake pedal. For coasting, all the driver has to do is to change the gear shift into neutral and slightly depress the clutch.

In the modification according to Fig. 2, the power unit is of the type where the force to apply the brakes is not that of atmospheric pressure but that of the spring and wherein the suction enters in front, instead of the rear, of the piston. With such power unit the adjustment of the valves 21 operated from the gear shift g and that of the valves 22, 23 operated from the clutch is different from that in the first modification. The piston 21a of valve 21 is provided with two cross passages 21b, 21b which are both displaced relative to the passages 10d of the valve cylinder closing the valve, when the gear shift is in neutral, but either of which will register with said passages 10d when the gear shift is in speed either forward or reverse.

Furthermore, valve 23 is so adjusted that it will open when the clutch is only partly depressed but will be closed when the clutch is up or completely depressed.

The pipe connections are as follows:

Branching from the main pipe s is a pipe 25 leading into one side of cock 22 and leading from the other side of cock 22 is a pipe 26 terminating into one of the passages 10d of valve 21. Leading from the other passage 10d of valve 21 is a pipe 27 which terminates into the front end of cylinder p of the power unit, and branching from said pipe 27 is a pipe 28 terminating in one side of cock 23. Another pipe 29 leading from the opposite side of cock 23 connects with the main pipe s.

The operation of the device of this modification is in other respects identical with that of the first modification.

By the term "neutral" hereinbefore used as applied to the gear shift g, I mean the position the gear shift lever g occupies in inoperative position or when out of speed, and as applied to the clutch pedal l, I mean the position thereof when not depressed.

It is, of course, understood that the means for controlling the power unit through the gear shift and clutch for attaining the results described may be varied according to the nature of the power unit employed, and that various other changes may be made in the construction and arrangement of the parts without departing from the principle of my invention. I, therefore, wish it to be expressly understood that I do not restrict myself to the details described and shown.

What I claim is:

1. In a motor vehicle having suction creating means, brake mechanism, clutch and gear shift, a suction controlled power unit for operating said brake mechanism and a system of valves included in the suction pipe system of said power unit actuated from said gear shift and clutch for controlling the suction in said power unit so as to automatically operate said brake mechanism.

2. In a motor vehicle according to claim 1, in which said valves are in such relation to one another that when the gear shift and clutch are both in neutral position or when the gear shift is in speed and the clutch is completely depressed, braking action will be automatically effected, but when the clutch is only partly depressed and the gear shift either in neutral or in speed said braking action will be automatically released.

3. In a motor vehicle having braking means, clutch and gear shift, a power unit controlled from the motor for operating said braking means and means intervening between said power unit and motor and actuated from said gear shift and clutch for controlling said power unit so as to automatically operate said braking means.

4. In a motor vehicle having braking means, clutch and speed control means, a suction controlled power unit for operating said braking means and means included in the suction system of said power unit and actuated from said clutch and speed control means for controlling the suction in said power unit so as to automatically operate said braking means.

ABRAHAM WEISS.